Nov. 8, 1966 G. L. CLAPPER 3,284,780

ADAPTIVE LOGIC SYSTEM

Filed Dec. 19, 1963 4 Sheets-Sheet 1

INVENTOR
GENUNG L. CLAPPER
BY Paul M. Brannen
AGENT

Nov. 8, 1966

G. L. CLAPPER 3,284,780

ADAPTIVE LOGIC SYSTEM

Filed Dec. 19, 1963

4 Sheets-Sheet 3

Nov. 8, 1966

G. L. CLAPPER 3,284,780

ADAPTIVE LOGIC SYSTEM

Filed Dec. 19, 1963

4 Sheets-Sheet 4

3,284,780
Patented Nov. 8, 1966

3,284,780

ADAPTIVE LOGIC SYSTEM

Genung L. Clapper, Vestal, N.Y., assignor to International Business Machines Corporation, New York, N.Y., a corporation of New York Filed Dec. 19, 1963, Ser. No. 331,832
13 Claims. (Cl. 340—172.5)

Figure 1:
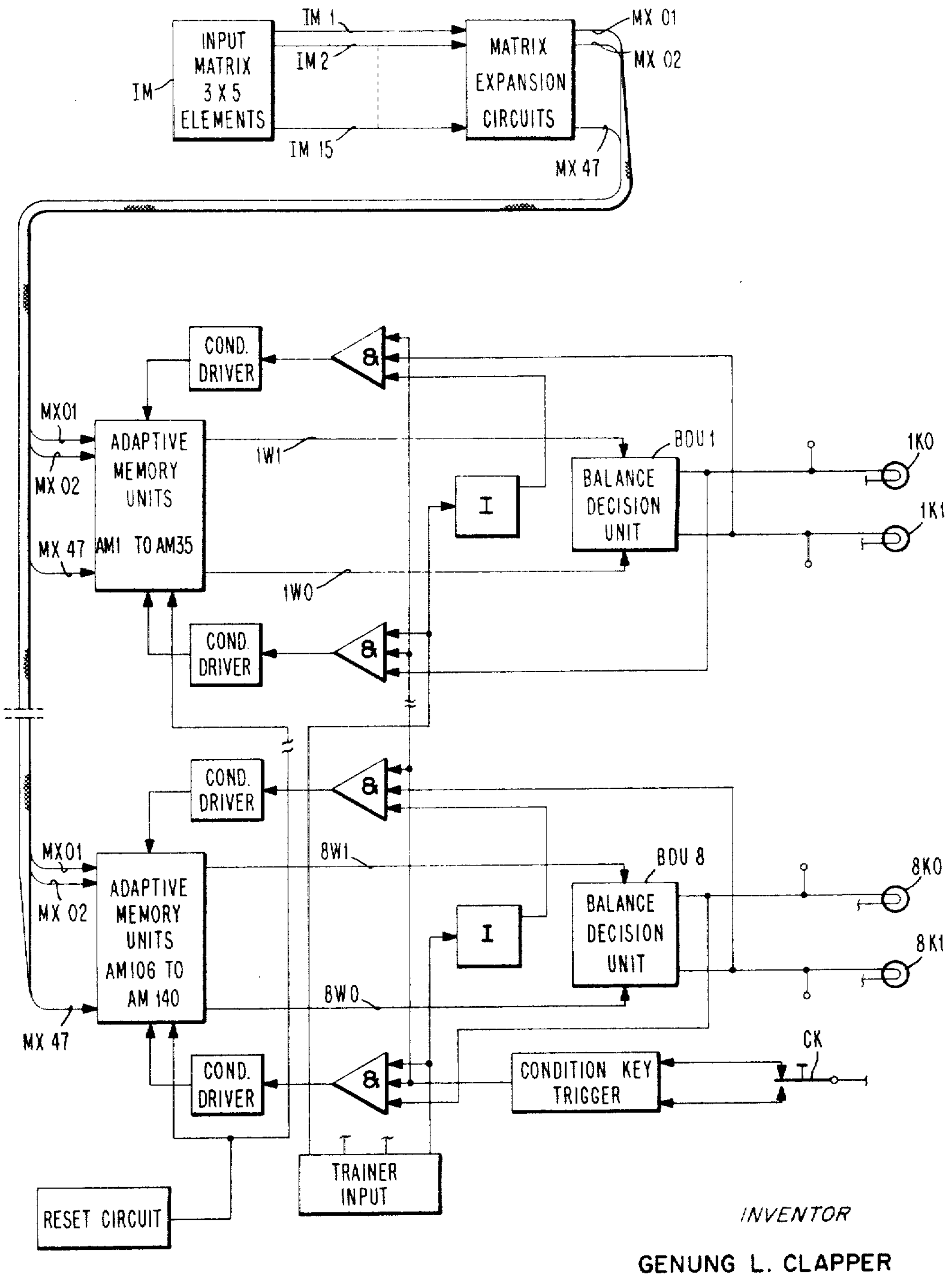

This invention relates to adaptive logic systems and particularly to an improved adaptive logic system in which the input information is transformed to an expanded form, thereby rendering groups of such transformed information more readily distinguishable one from the other than in the original information. This transformed information is supplied to a plurality of metastable memory devices and decision units which provide ternary outputs having one balanced and two unbalanced conditions.

A simplified adaptive logic system in accordance with previous known teachings and arrangements would be one in which input information is supplied thereto and which utilizes association or memory devices which have so-called majority logic functions. The outputs from the association units are variable in weight and outputs are summed and then compared to a given single fixed threshold in the response or detector unit attached thereto. Should the sum weights of the outputs supplied to the comparison circuit exceed the single fixed threshold, a binary output is supplied from the detector unit. The weights are adjusted by training the system to provide desired outputs upon the supply thereto of the necessary input signals. Thereafter the system will function to provide the required outputs when the inputs for which it has been trained are supplied thereto.

In systems of the type described, the problem of providing adequate separability for various patterns of input information is difficult, unless an extremely large number of adaptive units are used; essentially, one for each of all the possible combinations of inputs. Such an arrangement, of course, will provide complete separability of all the inputs but, on the other hand, for a reasonable system capacity, requires a tremendous amount of apparatus and an extremely long training or conditioning time. Taken at the other extreme, systems may be devised which utilize the input information without transformation, but in such systems there is a limit to which the separability between the inputs can be carried for adequate recognition between the different inputs.

With regard to the use of a single threshold, many memory or adaptive logic devices are inherently unstable in their nature and will tend to drift or displace from the position to which they have been or the condition in which they have been placed by the training process. The instability or drift will cause the weighted outputs therefrom to vary so that, in effect, the adaptive logic system becomes ineffective to render the outputs for which it has been trained. Thus, it is highly desirable that the fixed threshold approach in making the decisions in the system be eliminated if possible.

Accordingly, a prime object of this invention is to provide an improved adaptive logic system having input signals supplied thereto from a field or space which has been expanded or transformed into a plurality of sub-spaces, such inputs being provided to a plurality of adaptive memory units utilizing a ternary balanced type of output.

Another object of the invention is to provide an adaptive logic system in which a given space or field of input is subdivided into sub-spaces or sub-fields, and each possible combination of possible inputs in each sub-space is separately provided as inputs to adaptive memory units in said system.

Another object of the invention is to provide an adaptive logic system in which a given space or field of input is subdivided into sub-spaces, and each useful combination of possible inputs in each sub-space is separately provided as inputs to adaptive memory units in said system.

A further object of this invention is to provide an adaptive logic system in which the input information is transformed to an arrangement which provides a greater degree of separability between the input functions which it is desired to recognize.

Yet another object of the invention is to provide an adaptive logic system in which the input information is transformed to an arrangement which represents an optimum between the utilization of all combinations of all inputs and lesser combinations of all inputs.

Another object of the present invention is to provide an adaptive logic system in which a plurality of metastable memory devices having balanced outputs are employed, the outputs being effective when on one side or the other of a neutral condition to provide weighted values on a normally balanced set of output lines common to a plurality of memory devices.

Another object of the invention is to provide an adaptive memory system in which the outputs of the adaptive memory units are balanced so that it is unnecessary to employ a single threshold value but rather to indicate the relative weighting of the summed outputs.

Still another object of the invention is to provide an adaptive memory system in which the summation of weighted outputs on a pair of output lines is detected by suitable means to provide an indication of equal and unequal balance states.

A further object of the invention is to provide an adaptive logic system in which the memory devices provide balanced outputs which are detected by balance decision means providing ternary or three state outputs.

Briefly described, the subject system constitutes an adaptive memory system in which a plurality of inputs are provided in the binary system and are transformed into a predetermined number of the possible combinations which the binary inputs may take to provide a plurality of transformed inputs having improved separability characteristics over the original input set. The transformed inputs are supplied to a plurality of adaptive memory units, the number being determined by the total number of transformed inputs and the number of desired output conditions which are to be indicated. These adaptive memory units constitute metastable devices which have a null or neutral state from which they may be conditioned to one or more active states on each side or in either direction from the null or neutral condition. Such displacement or conditioning causes the adaptive memory unit to supply, on an associated set of output lines, voltages which indicate the degree to which the memory unit has been conditioned from one side or the other of its neutral state. Equal outputs indicate that the unit is in the neutral state.

All of these outputs from a bank of memory units common to a particular output condition are supplied via a pair of common output lines to a balance decision unit which is arranged and constructed in such manner that it provides a ternary output indicative of the balance of outputs on the two weighted output lines; that is, both outputs will be provided if both of the weighted output lines are equal in their weight; that is, the voltage thereon. If the output lines are not balanced, the balance decision unit will so indicate the direction of unbalance.

The foregoing and other objects, features and advantages of the invention will be apparent from the following more particular description of a preferred embodiment of the invention, as illustrated in the accompanying drawings.

In the drawings:

FIG. 1 is a diagrammatic view showing the entire system in simplified fashion.

Figure 2A:
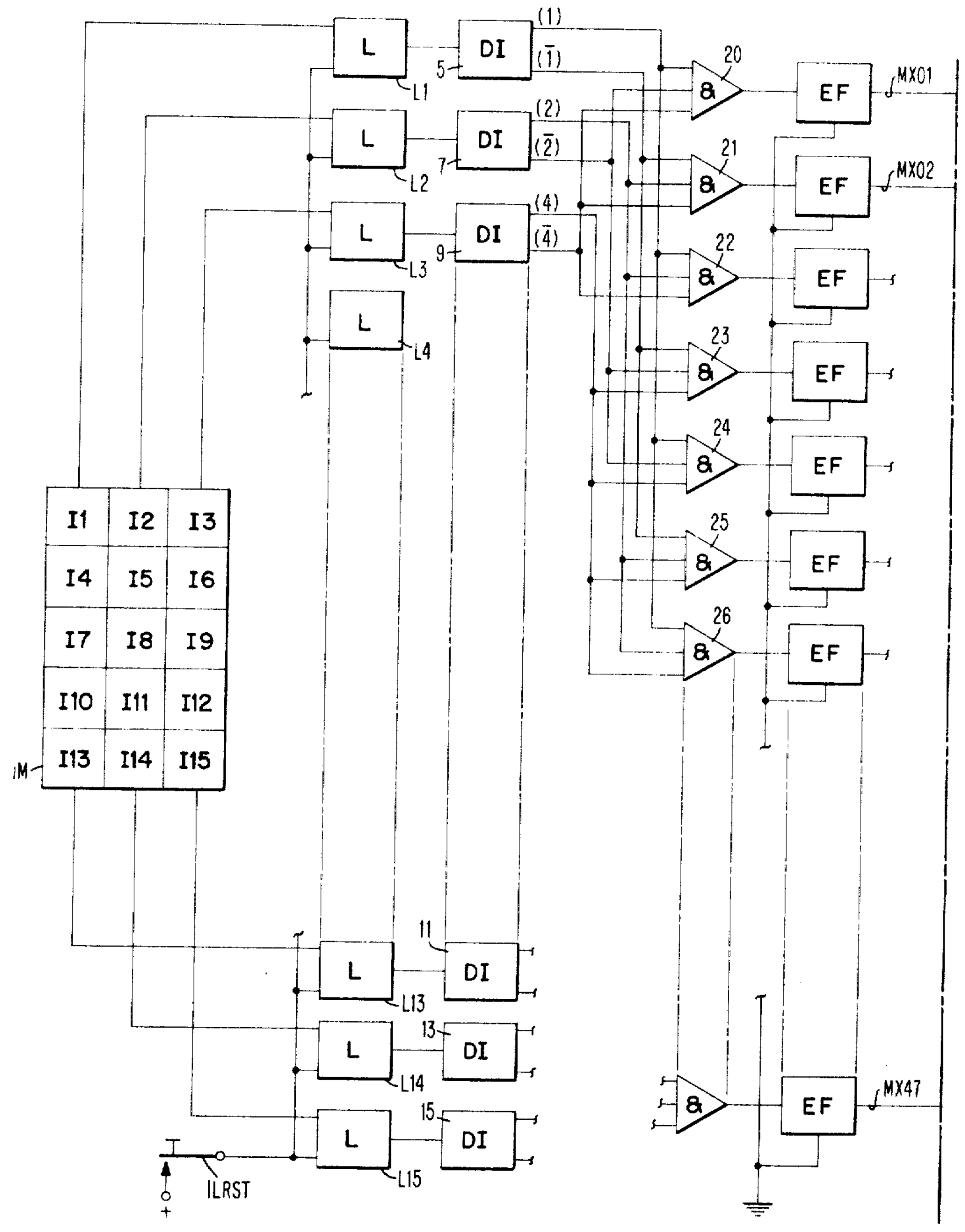
Figure 2B:
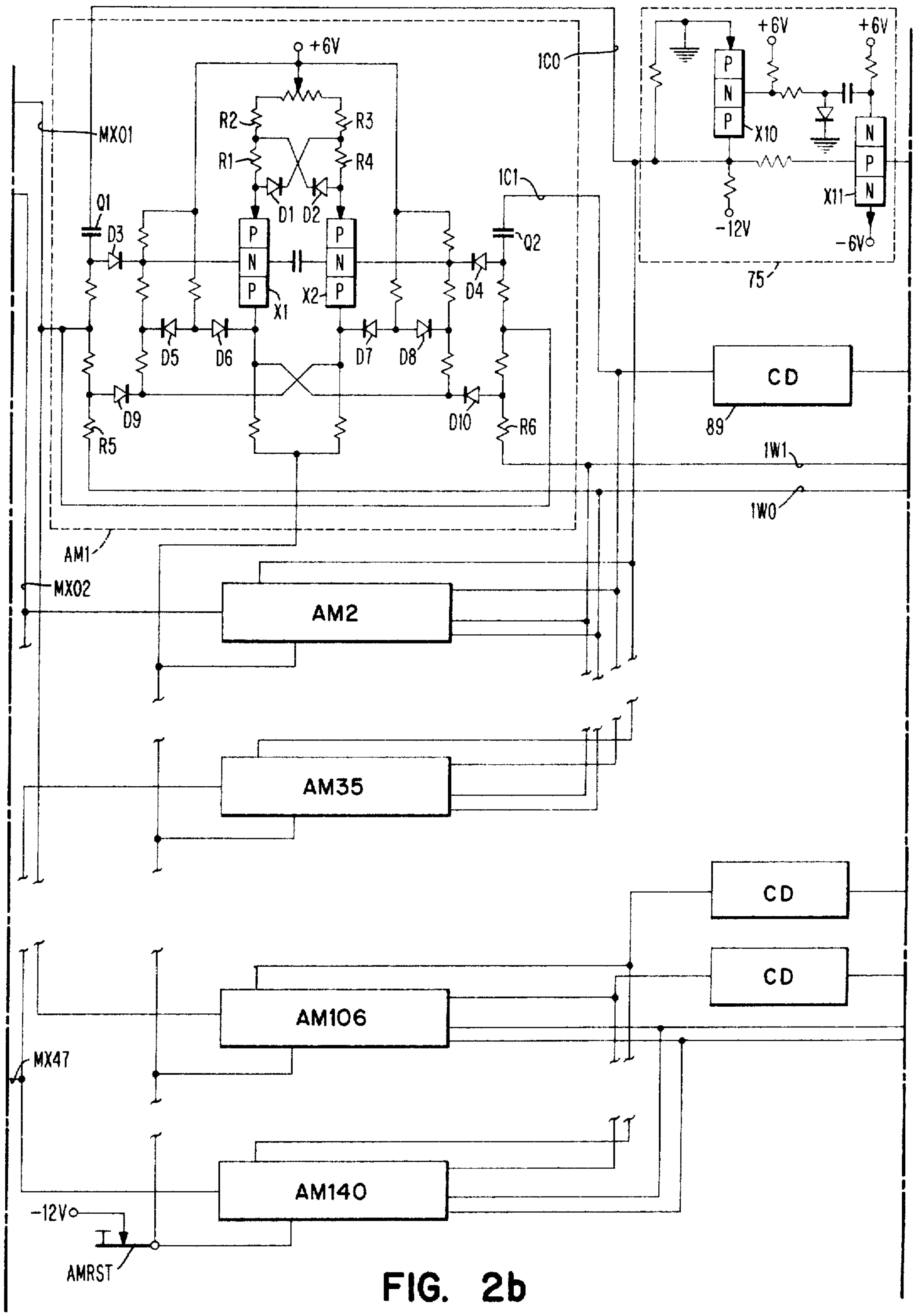
Figure 2C:
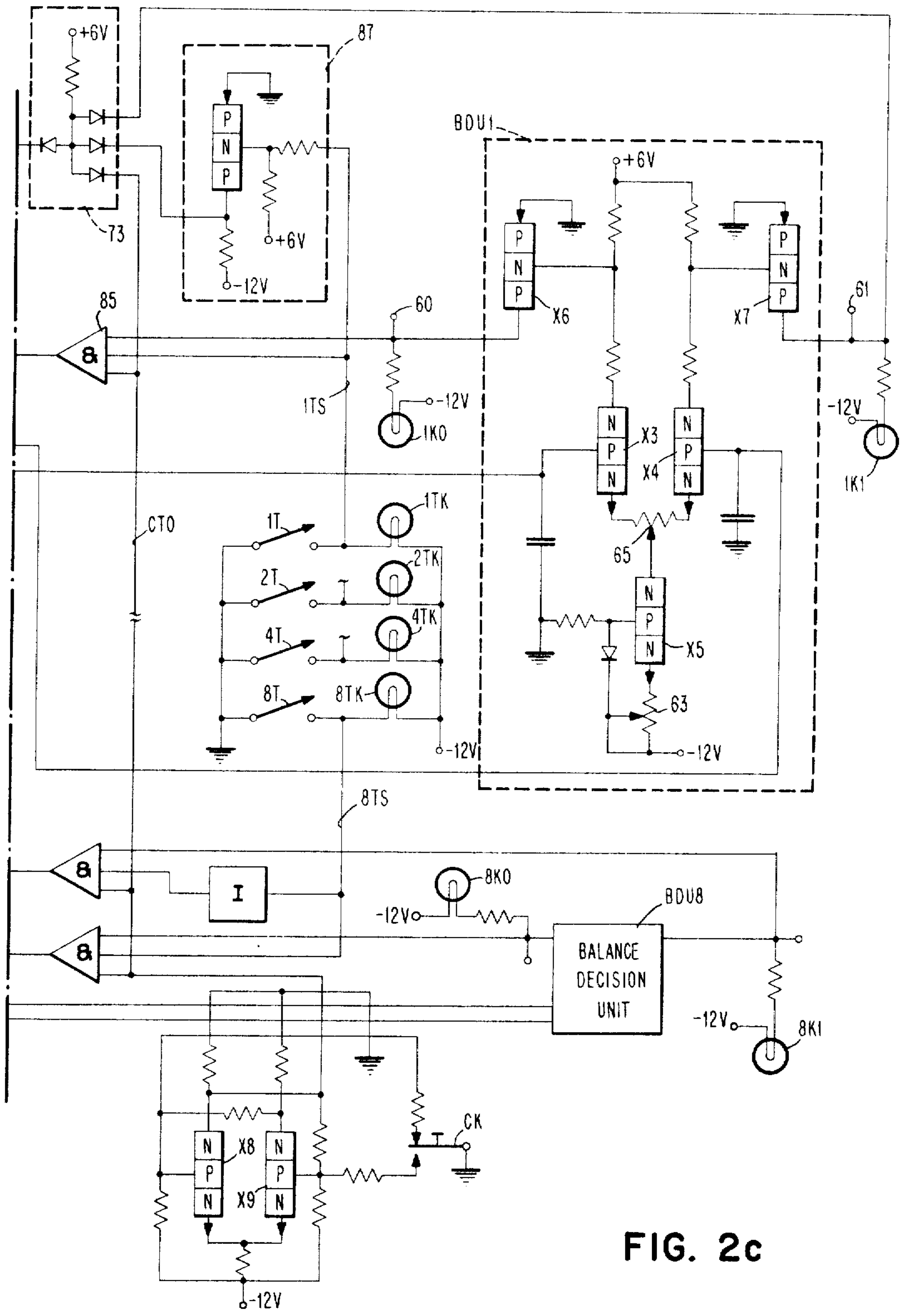

FIGS. 2*a*, 2*b* and 2*c*, placed side by side, are diagrammatic views, in more detail, of an adaptive logic system employing a preferred embodiment of the invention.

Referring to the general view shown in FIG. 1 of the drawings, the input to the system is derived from an input matrix IM which may have, for example, 15 elements arranged in rows of three and columns of five, from which 15 output lines, such as the lines IM1, IM2 through IM15 are supplied, these lines having signals thereon when the associated one of the elements in the input matrix is active. These input lines are connected to the matrix expansion circuits, to be later described, in which output signals are derived for the various combinations of inputs supplied thereto. These expanded or transformed outputs are designated by coded numbers, three of which are indicated as MX01, MX02 and MX47.

In general, the matrix expansion divides an input space or field, such as the input matrix IM, into a plurality of sub-spaces or fields, such as the individual rows, or columns, of the matrix IM. Then each possible combination of the inputs within such a sub-space is taken, or each useful combination; i.e., as in the present case, the null condition may be considered to impart insufficient information to justify the complication and expense of its inclusion.

Each possible combination, or each useful combination, is then supplied as an input to the adaptive memory units in the system.

Such an expansion, for a given field, provides a relatively constant number of active inputs to the adaptive memory units from the input, irrespective of the pattern the information takes in the field. This eliminates relatively large excursions away from the decision point in the learning process, thereby reducing training time. For instance, known systems may require more than 100 learning runs before conditioning is achieved for a set of 16 input patterns, whereas the present system may only need 10 runs.

Also, generalization is still possible, since the information in each of the sub-spaces can be related to the total information contained in the entire field, so that variations in the same general pattern presented in the total space will result generally in the same outputs from the same sub-spaces, hence learning of patterns proceeds more rapidly.

It should be noted that no limitation exists on the determination of the sub-spaces, nor on the combinations of inputs derived therefrom. For example, although the arrangement shown divides the matrix into sub-spaces of rows, sub-spaces of columns could be used, or combinations of rows and columns, or random sets of input elements can be taken as sub-spaces.

The expanded outputs are supplied in parallel to a plurality of banks of adaptive memory units, only such banks being shown in FIG. 1, the remainder being arranged in identical fashion. One such bank of adaptive memory units is provided for each output condition which is to be indicated and each of the banks contains a number of adaptive memory units equal to the number of inputs supplied thereto from the matrix expansion circuits. For example, the first bank of adaptive memory units contains adaptive memory units AM1 through AM35. The intervening two banks of adaptive memory units for the second and fourth orders of binary output are not shown, but the last bank, which would be for the binary output order of 8, will contain the adaptive memory units AM106 to AM140. As can be seen from the drawings, the inputs are supplied in parallel to each of these banks of memory units. Each memory unit in the bank is of a type which will be described in detail later; suffice it to say for the present that the memory unit, upon a supply thereto of suitable input and conditioning pulses, will provide an output on one or the other or both of a pair of output lines, depending upon whether or not the conditioning signals are such as to cause the memory unit to be displaced from one side or the other of a neutral condition.

The outputs from each of the adaptive memory units are supplied to a set of common output lines associated with the particular memory bank, such as the lines 1W1 and 1W0, associated with the first memory bank, and lines 8W1 and 8W0, associated with the last memory bank. The voltages on these output lines will be balanced or equal or will be unbalanced in accordance with the condition of the input-activated memory units in the memory banks to which they are connected. Thus, the condition of the adaptive memory units is reflected in the balanced or unbalanced condition of the output signal lines whenever an input pattern is presented. It will be apparent that variations in circuit parameters and environmental conditions, power supply variations and so on, will cause the outputs to vary together so that they will still maintain the same relative condition with each other, thereby eliminating many deleterious influences present in the known single threshold systems.

It should be further noted that the present system contemplates the application of varying voltages to fixed weighting resistors, as opposed to previous techniques requiring the use of variable resistors with a large number of possible values; and such resistors are uneconomical or tend to be unreliable.

Also, the provision of the matrix expansion, previously explained, makes it possible to use adaptive memory units having a relatively small number of stable states, such as 5, rather than the types previously known, which required many more stable conditions.

The outputs on the common output lines are supplied to a balance decision unit, one for each memory bank, such as the units BDU1 and BDU8. These balance decision units are sensitive voltage comparison devices, which monitor the condition of the voltage on the common output lines supplied thereto and provide output signals indicative of the balance or the unbalance of the voltages on these lines. For example, if the balance output line 1W0 has a slightly higher voltage than the line 1W1, then an output signal is supplied from the balance decision unit to the output terminal associated with the indicator lamp 1K0, indicating that the zero condition is present for the output of the first memory bank. Conversely, if line 1W1 has a higher voltage than 1W0, the indication lamp 1K1 will be lighted. In the event that the lines are balanced, or nearly so, within the tolerance of the balance decision unit, outputs will be present on both outputs from the balance decision unit and, therefore, both output indicator lamps 1K0 and 1K1 will be illuminated. Additional terminals are provided as shown, which may be supplied to further units, not shown, including decoding and utilization devices for utilizing the information supplied from the adaptive memory system. Since the ultimate use of the information stored by the system is not germane to the structure and operation of the system itself, these further details have not been shown.

The provision of balanced outputs differs from systems previously known which operated upon a single threshold response in that the present system is quite sensitive to a decision point; that is, only a small departure from a balanced condition is required to indicate an unbalance. In prior single threshold systems, it is not possible to know how far away the input is from the threshold or decision point.

Also, as pointed out previously, the relative constancy in the number of the active inputs to the adaptive memory units resulting from the matrix expansion means that the units that are inactive for any given input pattern present a relatively constant impedance to the balanced output lines. Hence, the outputs from the active units are essentially summing currents in the output lines, and the system does not require variable gain in amplifiers or variable resistance to achieve this effect.

In order to condition the adaptive memory units, signals from a trainer input are supplied both in normal and inverted form to the adaptive memory via associated AND circuits and condition drivers as shown. In addition to the trainer inputs, the AND circuits are supplied with an input from the opposing output line of the balance decision unit as well as an input from a conditioning key trigger which serves to render the conditioning circuits active only when desired. In operation, the trainer inputs are set for the desired output with a given input and, if the balance decision unit does not put out a signal of the suitable value, the output line from the balance decision unit combines with the inputs from the trainer input and a condition key trigger and via the condition driver, which is adapted to drive all of the memory units, serves to further condition the adaptive memory units which have inputs supplied thereto to increase or decrease their weight as necessary. After the adaptive memory units have been suitably trained, it is then possible to present various input combinations thereto and have the adaptive memory units supply appropriate outputs to the output circuits that cause the desired output to be produced.

It should be noted that the matrix expansion to a space that is more separable does not thereby remove from the system the valuable property of deductive generalization. That is to say, when the system has been trained on a set of input patterns; for example, the graphic digits and arithmetic symbols, it will have the ability to recognize "noisy" or imperfect patterns as well as the patterns that were used in the training routine.

Referring now to the detailed drawings, FIGS. 2*a*, 2*b* and 2*c*, taken together, the input to the system is considered to be derived from a plurality of input devices, which may be arranged in matrix fashion, designated by the reference character IM denoting input matrix. The matrix shown is a 3 by 5 matrix; i.e., there are three elements per row and five rows. However, it is to be understood that any number of rows and columns could be utilized. Each of the input elements is distinctively labeled as shown, I1, I2, I3, I4, etc. These elements may be, for example, photocells arranged in a matrix for detecting a pattern projected thereon. The outputs from each input element in the matrix IM; i.e., the elements I1 through I15, inclusive, are supplied as inputs to latch or trigger storage circuits indicated by the rectangles designated with the letter L and with the reference characters L1 through L15, only seven of which are shown. These latches are of conventional construction and arranged in such manner that an input thereto from the associated input element of the input matrix will cause the latch to be set ON and the latch will remain in its ON condition unless and until the input latch reset button ILRST is depressed, at which time energy is supplied to the reset circuits of all of the latches to restore them to their normal or OFF condition. The input latches L1 through L15, accordingly, serve as an input storage medium which provides input information to the subsequent circuitry. It should be noted that, if the input from the matrix is persistent, the latches can be eliminated.

Each of the input latches L1 through L15 have associated therewith a double inverter such as the ones indicated by the rectangles with the designation DI, reference characters 5, 7, 9, 11, 13, and 15, which constitute six out of the total of fifteen which would be provided in the arrangement shown. Each of the double inverters is arranged in a conventional manner to provide a normal and inverted output on the two output lines associated therewith. For example, the output lines associated with the double inverter 5 are designated by the reference characters (1) and ($\overline{\mathbf{1}}$), indicating respectively an output line on which the value 1 is indicated and another output line is which the value of $\overline{1}$ is indicated. When no signal is supplied to the double inverter from the associated latch, the negative output line is energized and, when a signal is supplied from the latch, the positive output line is energized. Similar outputs are provided on each of the fifteen inverters. In accordance with binary coding notation, the first three inverters 5, 7 and 9 have the output lines 1, 2 and 4 and their negatives provided therefrom. This is in accordance with the binary weighting for the first row of the input matrix, and the remainder of the output lines from the double inverters would be arranged in similar fashion as illustrated by the following table:

| Input Matrix Element | Binary Equivalent (output of DI) |
|---|---|
| 1 | 01-$\overline{01}$ |
| 2 | 02-$\overline{02}$ |
| 3 | 04-$\overline{04}$ |
| 4 | 11-$\overline{11}$ |
| 5 | 12-$\overline{12}$ |
| 6 | 14-$\overline{14}$ |
| 7 | 21-$\overline{21}$ |
| 8 | 22-$\overline{22}$ |
| 9 | 24-$\overline{24}$ |
| 10 | 31-$\overline{31}$ |
| 11 | 32-$\overline{32}$ |
| 12 | 34-$\overline{34}$ |
| 13 | 41-$\overline{41}$ |
| 14 | 42-$\overline{42}$ |
| 15 | 44-$\overline{44}$ |

The double inverters provide outputs which are combined in a plurality of AND circuits to provide in the present case seven expanded input or transformed input signals for each three element matrix row. Since each row of the matrix is expanded in similar fashion, only the detailed arrangement for expansion of the first row will be considered. As shown, there are seven AND circuits 20 through 26 provided, each having three inputs thereto and having a single output which is energized when and only when a signal is provided at each of the three inputs to the particular AND circuit. These AND circuits are connected so that they represent all of the possible combinations of outputs from the double inverters 5, 7 and 9 except the null combination; that is, the combination which exists when all of the negative output lines of the three inverters are energized, this corresponding to a condition in which none of the inputs in the input matrix have been energized. For instance an AND circuit 20 provides an output when there has been an input combination constituting a 1 and $\overline{\mathbf{2}}$ and $\overline{\mathbf{4}}$ condition for the first row, so that a prefix 0 would be used. This indicates an input to the first element of the first row but no input to the second and third element of the first row. The relationship of the remaining AND circuits in the first expansion for the first row of the input matrix are indicated in tabular form below.

| Inputs from Double Inverters | Output from AND Circuit |
|---|---|
| 01-$\overline{02}$-$\overline{04}$ | MX01 |
| $\overline{01}$-02-$\overline{04}$ | MX02 |
| 01-02-$\overline{04}$ | MX03 |
| $\overline{01}$-$\overline{02}$-04 | MX04 |
| 01-$\overline{02}$-04 | MX05 |
| $\overline{01}$-02-04 | MX06 |
| 01-02-04 | MX07 |

The outputs from the AND circuits 20 through 26 are supplied through suitable emitter followers as designated by the rectangles enclosing the reference characters EF, these being provided with a suitable gating input common to all of the emitter followers and grounded as shown. Thirty-five of the emitter followers EF are provided in the system, for each of the possible matrix expansion ouputs from the matrix expansion circuitry. The outputs of the emitter followers are designated by the reference character MX followed by a code designation indicating, first, the row and, second, the binary number designation for that particular line, as indicated in the foregoing table. Only three examples of these outputs are shown, MX01, MX02 and MX47, which are respectively the binary one output from the zero row or topmost row of the matrix, the binary two output from the zero or topmost row of the matrix and the binary seven output from the fourth or lowermost row in the matrix, the rows being numbered consecutively 0, 1, 3, 4, from top to bottom. The relationship between the outputs of all of the various elements of one row of the matrix and all of the output lines from the matrix expansion circuitry emitter followers for that row is illustrated in the following table.

| Active Matrix Element/s | Transformed Output |
|---|---|
| I1 | MX01 |
| I2 | MX02 |
| I3 | MX04 |
| I1, I2 | MX03 |
| I1, I3 | MX05 |
| I2, I3 | MX06 |
| I1, I2, I3 | MX07 |

A single transformed output is produced for the expansion of active elements in each row of the matrix. Thus, five out of thirty-five output lines will be active for input patterns having elements in five rows of the input matrix.

The 35 output lines from the matrix expansion circuits are carried in multiple to each one of a plurality of banks of adapative memory units, each bank having 35 units therein corresponding to the 35 matrix expansion lines. The number of banks is determined by the number of binary outputs by which it is desired to indicate the output conditions for a given set of input conditions supplied to the input matrix. In the present instance, it will be assumed that four banks of adaptive memory units of 35 units each will be utilized to provide binary outputs which, in binary coded fashion, namely, 1, 2, 4 and 8, can supply a total output considered decimally zero to fifteen. Thus, there will be a total of 140 adaptive memory units, only one of which will be described in detail since the structure of all are similar.

As shown in FIG. 1*b*, the adaptive memory unit AM1 includes the apparatus shown in detail in the dotted rectangle designated AM1. These units are also disclosed and claimed in a copending application (IBM Docket 6514).

Each of the memory units includes a pair of PNP transistors, such as X1 and X2, together with a plurality of diodes such as the diodes D1 through D10, and resistive and capacitive elements which, in combination, form a metastable storage device having a neutral or reset state and having a plurality of settable conditions in either direction from the neutral state. In the present instance, there are two stable states on either side of the neutral state so that, in effect, an adaptive memory device in the present arrangement has five stable states. Each of the memory units, such as AM1, has an activating input which is supplied from the matrix expansion circuits, such as the line MX01. All other lines from the matrix expansion circuits are connected to the adaptive memory units in that particular memory bank. The input from the matrix expansion controls conditioning pulses to the 5-state trigger to move it from one state to another and also controls the application of the weighted outputs to the output lines. The diodes D3 and D4 are associated with the pair of gates controlling the conditioning in the arrangement shown and diodes D9 and D10 are associated with the gates controlling the summation of the weights on the output lines. The central part of the circuit is a 5-state trigger which is basically an Eccles-Jordan flip-flop modified to have three additional stable states by the use of diode pairs D1, D2; D5, D6; and D7, D8.

When power is supplied to the circuit, or following a resetting operation which is provided by operation of the reset key AMRST, the diodes D1 and D2, which are cross-connected in the emitter circuits of the transistors X1 and X2, provide a stable mode at a midpoint or a neutral state for the trigger. At this time equal collector current flows in X1 and X2 and the voltage level at the collectors is equal at some predetermined potential, say, for example, at −4 volts. The emitters of X1 and X2 are also at equal voltage levels and the emitter impedance taps are at a higher level; that is, the intermediate taps between the resistors such as R1, R2 and R3, R4. Thus, D1 and D2 are both reverse biased. The emitter impedances are therefore not connected in parallel and, since the emitter impedance is greater than the collector impedance, the effective gain of each stage, that is, either side of the trigger, is less than unity. Thus, the circuit is stable at this point and the net weight applied to the balanced output lines from the unit will be considered to be zero since equal current flows in the resistors R5 and R6, which are connected to the common summation output lines for all of the memory units in the bank and which are designated by the reference characters 1W0 and 1W1.

A conditioning pulse on the common conditioning line for zero conditioning for the first bank, namely, 1C0, supplied along with an input on the line MX01, will cause a positive transient to be supplied to the base of transistor X1 via capacitor Q1 and diode D3. This reduces the collector current of X1 and causes the collector voltage to start dropping towards some negative value, such as −12 volts, to which the collectors are returned. At the same time the emitter of transistor X1 starts rising towards +6 volts and the diode D1 will conduct. Increased current flowing in transistor X2 causes the collector voltage to rise until it is equal to the voltage at the divider tap in the impedance from the collector of transistor X1 to the base of X2, at which time the diodes D7 and D8 will conduct equally. With both diodes D7 and D8 conducting, a low impedance inverse feedback path is established from the collector of transistor X2 to the base thereof which stabilizes the trigger at a first stable condition on one side of the neutral point, where the voltage may be, for example, −6 volts at the collector of transistor X1 and −3 volts at the collector of transistor X2 with a difference therebetween of −3 bolts. This might be indicated as the −1 weight condition. This condition is indicated on the summation lines because the current flowing to the summation line 1W0 is now greater than that flowing to the 1W1 line since the collector of transistor X2 is more positive than the collector of transistor X1. Another pulse on the condition zero line for the first memory bank; namely, 1C0, still in the presence of an input gate, would reduce the current in X1 still further. The collector of transistor X1 would drop to its lowest level, say for example, −10 volts, as transistor X1 approaches cutoff and X2 approaches saturation, raising its collector voltage to some value such as −1 volt. The trigger is now stable in a second condition on one side of the neutral point which might be designated as a −2 weight and, therefore, the current supplied to the 1W0 line is now a maximum of −2 units.

The state of the trigger can now be changed to add increasing weight to the summation output line 1W1 by applying pulses to the condition 1 input line 1C1 at the time that a signal is present on the common input to the two sides of the trigger on line MX01. These inputs will be supplied to the base of transistor X2 via capacitor Q2 and diode D4 and the first pulse will move the trigger from the −2 weight condition to the −1 weight condition where diodes D7 and D8 would again stabilize the circuit. A second pulse on the line 1C1 will bring the trigger to its neutral state as originally described. A third pulse would bring the diode pair D5 and D6 into action and, as a result, the trigger will be set to a condition where the collector voltage for X1 will be at approximately −3 volts, whereas the collector voltage for the X2 will be at −6 volts. The difference between the voltage of the collector of X1 and the collector of X2 will be +3 volts and this may be designated as the +1 weight condition. A fourth pulse will cause the transistor X2 to approach cutoff and transistor X1 to approach saturation, which would then stabilize the trigger in a state where the collector voltage of X1 is approximately −1 and that for the collector of X2 is approximately −10, which may be considered a +2 weight for the trigger. Thus, the adaptive memory unit AM1 may be changed through its full range of five stable states and can be reversed as often as necessary by applying conditioning pulses to the appropriate line at the time that an input signal is present. Conditioning pulses are applied in common to all of the adaptive memory units in any one bank when adaptation is necessary via circuitry to be subsequently described. Only those adaptive memory units which are activated by inputs from the matrix expansion circuits will respond to such conditioning. It should be noted that the units which do not have an input signal from the matrix expansion cannot change state at the time the conditioning pulses are applied nor do they affect the summation of weights on the summation output lines for their particular bank since the input lower level is below the lowest level that the collectors of the transistors in the adaptive memory unit can reach. Moreover, the units having zero weight; i.e., in their neutral state, cannot add to the net weight on the summation output lines in the presence of an input signal thereto because current flows equally into the summation output lines and, accordingly, the difference between the lines is not changed.

An important feature of the present invention is the provision of an adaptive memory system in which the adaptive memory units provide outputs on two summation output lines which are balanced or unbalanced in accordance with the state in which the adaptive memory units are placed by the conditioning and input pulses. The use of balanced output lines for the adaptive memory units removes the effects of variations in input levels, power supply voltages and other parameter variations such as component aging and the like. Since such changes will affect the circuits connected to both of the output lines to the same degree, it can be seen that, by determining only the balance which exists between the two lines, the common effects which affect both lines equally are cancelled out.

In order to determine the balance between the summation output lines from the individual banks of memory units, such as the balance between the lines 1W1 and 1W0, a plurality of balance decision units are provided, one for each bank of memory units. In the present instance, since there would be four banks of memory units, each associated with the binary orders 1, 2, 4, 8, in the output, there would be four balance detection units, only two of which are shown in the drawings; namely, BDU1 and BDU8. It will be understood that all of these units are similar and a detailed description of the balance decision unit BDU1 will suffice for all units in the system. The balance decision units examine the summation output lines from the memory units for balance or unbalance. When the memory is unconditioned so that all of the adaptive memory units are in their neutral state, the inputs to the decision unit will be alike and all patterns will give the intermediate or "don't know" response which could be considered a neutral state for the decision unit. The neutral state permits conditioning in either direction. After conditioning, the memory weights will sum up to give a learned response for particular input patterns and, in making a decision, no fixed threshold is used but a comparison is made between the zero and the one summation output line; the line with the highest or most positive voltage determining the output. This determination is made by the balance decision unit comprising a sensitive voltage discriminator device which includes a pair of emitter-coupled transistors X3 and X4 with a transistor X5 acting as a constant current source to increase the sensitivity of the arrangement.

First consider the case where no input pattern is present in the matrix so that the summation output voltages are the same. At this time transistors X6 and X7 which are connected in the collector circuits of X3 and X4 will conduct by virtue of the equal current distribution between the transistors X3 and X4. X5, acting as a constant current device, limits the current to a particular value, say for example, 3 milliamperes. This current divides equally between transistors X3 and X4 so that each conducts one half of the total; i.e., 1.5 milliamperes. With suitable circuit parameters then, a smaller current flows in the base circuits of the transistors X6 and X7 to bring these to saturation. Thus, in this present instance, an equality of the inputs of the decision unit is effective to energize both of the outputs. The outputs of the balance decision unit may be supplied to a suitable output terminal such as 60 and 61, and the outputs may also be indicated by suitable output indicator lamps such as the lamps 1K0 and 1K1, shown in the drawings, both of which would be lighted at this time since transistors X6 and X7 are both conducting.

A relatively small difference in the potential between the two summation lines 1W1 and 1W0, such as 0.05 volt, will cause the current to be unequally distributed between the transistors X3 and X4. If under these circumstances the input voltage on 1W0 is greater or more positive than 1W1, transistor X3 will conduct almost all of the current which in turn will hold ON transistor X6; but transistor X7 will be turned OFF as the voltage at the base of this transistor rises towards +6 volts. Conversely, if the voltage on the summation output line 1W1 is more positive than that on 1W0, transistors X4 and X7 conduct to provide a 1 output and turn OFF the 0 output. The adjustable voltage divider 63 in the emitter circuit of transistor X5 provides an adjustment to regulate the amount of sensitivity to which the balance detector unit will respond. Also, an adjustable resistor 65 is provided to center the null point within the insensitive zone. In a memory bank of 35 units, the minimum difference for one unit of weight may be arranged to be of some relatively low voltage such as 0.1 volt for example, and the insensitive zone may be 0.05 volt on either side of the null point.

The conditioning of the adaptive memory units is accomplished by operation of a conditioning key which in turn controls a conditioning trigger, the output of the conditioning trigger being fed along with information from the balance decision units and a training switch input to appropriate logic circuits from whence a signal is supplied to a condition driver circuit which in turn supplies conditioning pulses to each of the adaptive memory units in the particular memory bank. Since all of the circuitry is similar, only one set of conditioning circuits will be described and it will be understood that the remainder are arranged in similar fashion. The conditioning key or switch CK is a spring loaded key which, in its normal condition, causes a conditioning trigger comprising two transistors X8 and X9 to assume one of its two stable states. When the conditioning key is operated, the trigger is switched to its other state and provides an output pulse, returning to its initial state when the key is released. The conditioning key trigger is conventional in construction, consisting a pair of NPN transistors X8 and X9 which are emitter coupled, and which have the biases changed thereon in accordance with the operation of the conditioning key CK. Suitable cross-coupling circuits are provided to insure that the one half of the trigger is turned off while the other is turned on and so forth. The output from the conditioning trigger is supplied to a common conditioning trigger output line CT0, which is supplied to a plurality of AND logic circuits associated with each memory bank. One such logic circuit is shown at 73 and constitutes a plurality of diodes connected to a load resistor and to a suitable source of energy in conventional fashion, so that inputs must be present at each of the three gating diodes in order to provide an output therefrom. The output from the AND circut 73 is supplied to a conditioning driver indicated by the dotted rectangle 75 and comprising a pair of transistors X10 and X11, connected in such manner that an input pulse supplied from the AND circuit 73 will cause the conditioning driver to provide an output pulse on the conditioning line, such as 1C0, connected thereto. Sufficient power is provided by this driver to drive all of the adaptive memory units in the bank, in this particular instance 35. An R-C timing circuit from the collector of transistor X11 to the base of transistor X10 controls the duration of the output pulse so that a pulse of constant width is produced that is independent of the duration of the input pulse from the AND circuit 73.

The training of this system is under the control of a plurality of training switches, one for each bank, which are designated in binary code fashion by the reference characters 1T, 2T, 4T and 8T. These switches, when closed, establish a circuit from —12 volts to ground through an associated indication lamp, such as lamps 1TK, 2TK, 4TK and 8TK. With the switch open, the training signal lines, such as 1TS, connected to the switch have a negative potential supplied thereto through the lamp. When the switch is closed, the lamp is lighted and the potential on the line goes to ground. This difference in potential is supplied directly to one of the AND circuits, such as 85, and is supplied to the other AND circuit, such as 73, via an inverter, as 87. The inverter comprises a PNP transistor connected in such manner that the input and output signals are inverted. The remaining input to the AND circuits in the conditioning portion of the system, such as the AND circuits 73 and 85 for the first bank, are supplied from the outputs of the balance decision unit associated with that particular bank; for example, the output signals from BDU1 are supplied to one of the inuputs to AND circuit 85 and the output from BDU1 at terminal 61 is also supplied to one of the inputs of AND circuit 73. It will be noted that the output from the balance decision unit indicating the 1 condition is fed back to the adaptive memory unit to influence the zero condition weighting while the output from the 0 condition for the balance decision unit 1 is fed back via AND circuit 85 and a conditioning driver 89 to the conditioning line 1C1 which weights the adaptive memory unit AM1 in a positive direction. Similar conditioning circuits with suitable inputs from the associated balance decision units and from the training switches are provided for each of the other banks in the system.

In adapting a system to distinguish different combinations of inputs, a particular combination of inputs is entered into the memory by appropriately energizing selected elements of the input matrix which, via matrix expansion circuits, are entered into the adaptive memory with the desired output combination set up on the training switches. The conditioning key is then operated and those memory banks which indicate an output other than that desired are automatically conditioned by the signals supplied from the balance decision unit and the training switches via the AND circuits and conditioning drivers to shift the particular input-activated adaptive memory unit or units in the proper direction. A second set of inputs is then supplied to the input matrix and the process is repeated with the training switches being set to provide the selected output for the second set of inputs. After a first run of such training operations, it will be found necessary of course to return and recondition some of the adaptive memories, since they will shift back and forth during the memory process, and several runs through the learning process will be required before the system will adapt to a particular set of inputs with a particular set of outputs.

From the foregoing, it will be apparent that this invention provides a novel adaptive logic system having a number of unique features and concomitant advantages. A particular feature is the matrix expansion, by which the field from which input information is to be obtained is divided into a plurality of sub-fields, and combinations of inputs to the sub-fields are considered. Another particular feature is the provision of a ternary output from the adaptive memory units, utilizing the degree of balance achieved on pairs of output lines. These features, along with all of the ancillary features described in the foregoing description, provide an adaptive logic system which is economical in construction, can be conditioned in a much shorter learning cycle than prior systems, and yet obtains a high degree of separability for the input functions. In addition, a feature of deductive generalization is present that allows noisy or imperfect input patterns to be correctly categorized.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An input expansion apparatus for an adaptive logic system comprising, in combination, (a) a plurality of input circuits on which input signals are provided, said plurality of input circuits constituting an entire input field which is divided into a plurality of sub-fields;

(b) combinatorial means having input and output circuits for combining all combinations of signals supplied thereto and providing a plurality of output signals indicative of each possible combination of inputs supplied thereto, one said combinatorial means being provided for each of said sub-fields; and (c) means for connecting each said combinatorial means to its associated sub-field input circuits.

2. An input expansion apparatus for an adaptive logic system comprising, in combination, (a) a plurality of groups of input lines, each group constituting a sub-field of the entire input field;

(b) combinatorial means, one for each of said groups for combining inputs present on said lines and furnishing output signals, one for each combination of inputs, except the null condition; and (c) output means connected with said combinatorial means.

3. Matrix expansion means for an adaptive logic system comprising, in combination, (a) a plurality of input lines divided into groups corresponding to the rows of a rectangular input matrix and connected to receive inputs from the corresponding element in said matrix;

(b) combinatorial means, one for each row of said matrix, for combining inputs on the input lines from the associated row and providing an output for each combination of inputs; and (c) output means connected to said combinatorial means.

4. Matrix expansion means for an adaptive logic system comprising, in combination,
(a) a plurality of input lines divided into groups corresponding to the columns of a rectangular input matrix and connected to receive inputs from the corresponding element in said matrix;
(b) combinatorial means, one for each column of said matrix, for combining inputs on the input lines from the associated column and providing an output for each combination of inputs; and
(c) output means connected to said combinatorial means.

5. Matrix expansion means for an adaptive logic system comprising, in combination,
(a) a plurality of input lines divided into groups corresponding to the rows and the columns of a rectangular input matrix and connected to receive inputs from the corresponding element in said matrix;
(b) a first set of combinatorial means, one for each row of said matrix, for combining inputs on the input lines from the associated row and providing an output for each combination of inputs;
(c) a second set of combinatorial means, one for each column of said matrix, for combining inputs on the input lines from the associated column and providing an output for each combination of inputs; and
(d) output means connected to said first and said second set of combinatorial means.

6. An adaptive logic system comprising, in combination,
(a) an input matrix having a plurality of input elements, said matrix being divided into a plurality of sub-spaces, each having a plurality of said elements therein;
(b) combinatorial means, one for each of said sub-spaces, for combining the signals from the input elements in said sub-spaces to furnish a plurality of tranformed output signals;
(c) a plurality of metastable adaptive memory units, one for each output combination, connected to said combinatorial means to receive the transformed output therefrom;
(d) conditioning means connected to said memory units to condition the units to predetermined conditions in accordance with the input signals supplied to said units and in accordance with desired outputs; and
(e) output means for indicating the state of said adaptive memory units and providing feedback signals for controlling said conditioning means.

7. An adaptive logic system comprising, in combination,
(a) an input matrix having a plurality of input elements arranged in rectangular form, said matrix being divided into a plurality of sub-spaces along a selected coordinate of said matrix;
(b) combinatorial means, one for each of said subspaces, for combining the signals from the input elements in said sub-spaces to furnish a plurality of transformed output signals;
(c) a plurality of metastable adaptive memory units, one for each output combination, connected to said combinatorial means to receive the transformed output therefrom;
(d) conditioning means connected to said memory units to condition the units to predetermined conditions in accordance with the input signals supplied to said units and in accordance with desired outputs; and
(e) output means for indicating the state of said adaptive memory units and providing feedback signals for controlling said conditioning means.

8. An adaptive logic system comprising, in combination,
(a) a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;
(b) input means connected to said memory units for setting said units in selected conditions;
(c) a pair of memory output signal lines connected to the output circuits of all of said memory units and having outputs thereon representative of the summed outputs of all of said memory units, and indicative of the direction of unbalance of the sum of all of said units; and
(d) means for detecting the balanced or unbalanced condition of signals on said output signal lines.

9. An adaptive logic system comprising, in combination,
(a) a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;
(b) input means connected to said memory units for setting said units in selected conditions;
(c) a pair of memory output signal lines connected to the output circuits of all of said memory units and having outputs thereon representative of the summed outputs of all of said memory units, and indicative of the direction of unbalance of the sum of all of said units;
(d) balance detection means connected to said output signal lines and responsive to signals on said lines to provide a first output when the signals on said memory output line are equal, a second output when the signals on said memory output lines are unbalanced in a first relation, and a third output when the signals on said memory output lines are unbalanced in a second relation; and
(e) means for indicating the first, second or third outputs from said balance detecting means.

10. An adaptive logic system comprising, in combination,
(a) a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;
(b) input means connected to said memory units for setting said units in selected conditions;
(c) a pair of memory output signal lines connected to the output circuits of all of said memory units and having outputs thereon representative of the summed outputs of all of said memory units, and indicative of the direction of unbalance of the sum of all of said units;
(d) balance detection means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;
(e) conditioning means for controlling the conditioning of said memory units to selected conditions in response to input signals, said conditioning means being controlled by said balance detection means to condition said memory units in a direction to displace said units from the condition indicated by said balance detection unit; and (f) means for indicating the first, second and third outputs from said balance detecting means.

11. An adaptive logic system comprising, in combination, (a) a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

(b) input means connected to said memory units for setting said units in selected conditions;

(c) a pair of memory output signal lines connected to the output circuits of all of said memory units and having outputs thereon representative of the summed outputs of all of said memory units, and indicative of the direction of unbalance of the sum of all of said units;

(d) balance detection means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

(e) conditioning means for controlling the conditioning of said memory units to selected conditions in response to input signals, said conditioning means being controlled by said balance detection means to condition said memory units in a direction to displace said units from the condition indicated by said balance detection unit; and (f) training means settable to selected conditions representing desired outputs, said training means governing said conditioning means to render said conditioning means responsive to govern said memory units when a variance exists between the desired output as selected by said training means and the actual output of said memory units as indicated by said balance detecting means.

12. An adaptive logic system, as claimed in claim 11, said conditioning means being proportioned and arranged so that it displaces the adaptive memory units by discrete steps each time said conditioning means is rendered effective.

13. An adaptive logic system as claimed in claim 11 further including conditioning selective means for rendering said conditioning means effective only during a training cycle.

References Cited by the Examiner

UNITED STATES PATENTS

| | | | |
|---|---|---|---|
| 3,022,005 | 2/1962 | Dickinson | 235—152 |
| 3,144,635 | 8/1964 | Brown et al. | 340—146.1 |
| 3,158,840 | 11/1964 | Baskin | 340—172.5 |
| 3,200,374 | 8/1965 | Ballard | 340—146.1 |

FOREIGN PATENTS

| | | |
|---|---|---|
| 1,307,396 | 9/1962 | France. |

ROBERT C. BAILEY, *Primary Examiner.*

I. S. KAVRUKOV, *Assistant Examiner.*